Oct. 19, 1926.

G. G. GILPIN 1,603,276

CORRUGATED HOPPER DOOR FOR RAILWAY CARS

Filed Nov. 5, 1925

Inventor:
Garth G. Gilpin
Vinton E. Sisson.
Attorney

Patented Oct. 19, 1926.

1,603,276

UNITED STATES PATENT OFFICE.

GARTH G. GILPIN, OF RIVERSIDE, ILLINOIS, ASSIGNOR TO UNION METAL PRODUCTS COMPANY, OF CHICAGO, ILLINOIS, A CORPORATION OF DELAWARE.

CORRUGATED HOPPER DOOR FOR RAILWAY CARS.

Application filed November 5, 1925. Serial No. 67,032.

The invention relates to a railway dump car having a "door" forming a part of the car for retaining the load therein which door is provided with hinges adjacent one of its edges and is capable of being "dropped" or swung open so that the load in discharging slides or passes over the upper surface of the door. Any means of raising the door to the closed position and any means for locking and releasing the door may be employed with my device.

A door for this purpose must be very strong and durable because:

First, it is a part of the floor of the car and as such must sustain the load as well as the impact blow of the load when the car is in motion. Second, the car is frequently loaded from chutes or tipples from a height of ten feet or more, causing the load to be dropped directly upon the doors. Third, clam shell buckets are frequently used to unload such cars and it is not uncommon for these buckets to rest upon and drag over the doors. Fourth, when the door suddenly comes to rest after being dropped, it is not only subjected to a severe shock but it must sustain the severe impact thrust of the load which of course follows the door. Fifth, as the load is theoretically equally distributed, the door must be strong over its entire area and must be capable of transmitting the resulting stresses to the car body without much deflection and no substantial distortion. Any bending of the door or drooping of the corners would cause a leak of the lading, especially of such fine material as sand, chats, etc. Any bending or warping might interfere with the complete closing and locking of the door.

As it costs as much to haul a ton of car as it does to haul a ton of paying freight, it is imperative that the car and any part thereof be as light as possible. Furthermore, the total weight of the car and freight is determined by the strength of certain standard axles, so that the lighter the car the greater amount of freight a given car will be allowed to carry.

An object of the invention is to make a door for a railway dump car by forming a metallic plate with its central portion depressed to form a panel with a continuous stiffening web surrounding it, which panel is formed with corrugations to stiffen it and to carry any load imposed thereupon to the surrounding web. The continuous web is positioned slightly within the edges of the plate to provide a marginal portion for contact with the associated parts of the car to make it lading proof. This marginal portion may be flanged to further stiffen the door.

The advantages of my door are applicable to any door of a freight car, such as drop bottom general service cars, (used in the drawings) hopper cars, swinging side doors or hopper bottom coal cars, etc.

Figure 1:
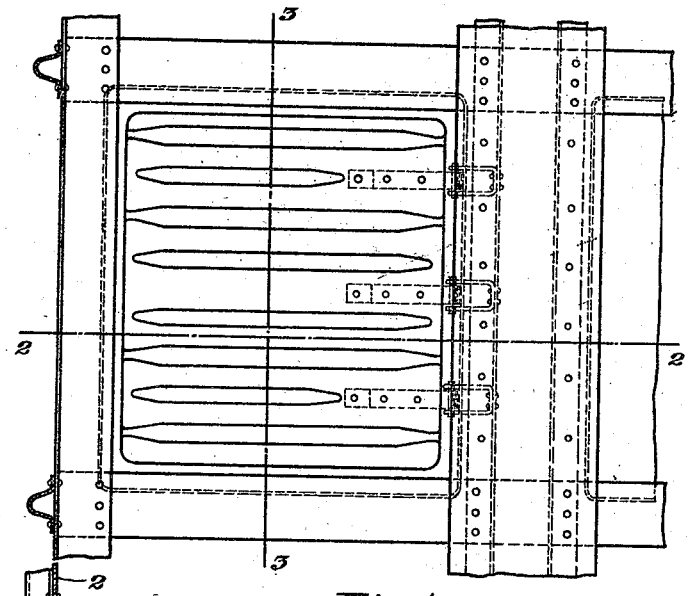
Fig. 1 shows a portion of a railway car with my device applied thereon.
Figure 2:
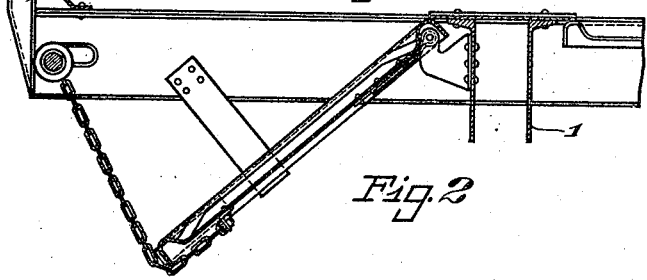
Fig. 2 is a section on line 2—2 of Fig. 1.
Figure 3:
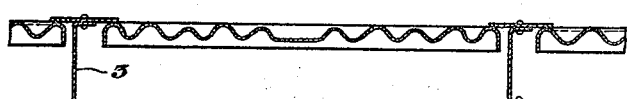
Fig. 3 is a section on line 3—3 of Fig. 1.

To illustrate one adaptation of my device, I have shown a so-called "general service" drop bottom gondola car wherein the major portion of the floor consists of drop doors. The door openings are surrounded by the center construction 1, side wall 2 and cross diaphragms 3. In normal or closed position the door completely closes this opening and in fact is a trifle larger on all sides than the opening so as to provide a lap joint between the door and the car frame members. The doors are hinged to the center construction and are supported adjacent the side wall by the raising or locking mechanism. Any convenient stop may be used to limit the downward movement of the door.

In my construction the central portion of the metallic plate is pressed to form a marginal portion 4 surrounding a continuous unending web 5 which surrounds a panel 6. This panel is reinforced with corrugations or integral ribs, some of which (7) traverse the panel and merge into a part of the opposite portions of the continuous web, while other shorter corrugations 8 traverse a part of the panel and merge into the panel preferably adjacent the opposite portions of the web. The two types of corrugations (7 and 8) may be positioned alternately but their relative number and position may be diversified to suit conditions. The shorter corrugations 8 are preferably shallower than the longer corrugations 7. The remaining portion 9 of the continuous web extends continuously and uninterruptedly on all sides of the door. This web receives the load from the corrugations and forms a beam or stiffener to prevent bulging in transmitting the load from the corrugations to the frame of the car.

The corrugations may be of greater or less depth than the depression forming the continuous web but are of less depth than the web 5 where they merge into it; in other words, they merge into a portion of the web.

The marginal portion 4 (or portions) may be provided with flanges 10 so as to further stiffen the sides of the door against deflection under load and to stiffen the entire door against buckling or distortion.

Figure 5:
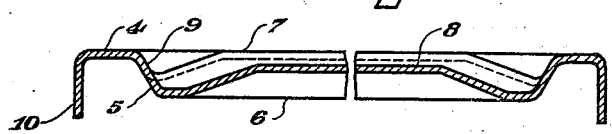
Fig. 5 shows a similar form.
Figure 4:
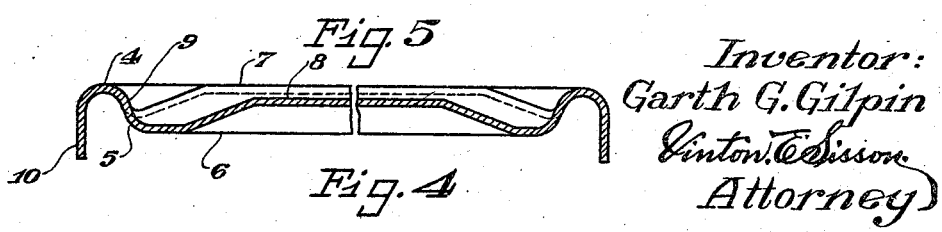
Fig. 4 is an enlarged section of the door.

The "web", "marginal portion" and "flange" may be straight or flat and connected by arcs of small radii (as shown in Fig. 5) or such parts may be formed on curves and connected by arcs of large radii (as shown in Fig. 4) and still come within the scope of this invention.

It is understood that the corrugation may extend toward the hinge edge of the door, and still come within the scope of the invention, and, furthermore, while I have described and claimed the door made of "a plate", it is understood that it may be made of one or more united plates and still come within the scope of the invention.

I claim:

1. In combination with the other elements of a railway dump car; a door made of a metallic plate formed with a marginal portion surrounding a continuous web which surrounds a panel, said panel provided with long corrugations which traverse the panel and merge into the opposite portions of the web, said panel also provided with shorter corrugations which traverse a part of the panel and merge into the panel.

2. In combination with the other elements of a railway dump car; a door made of a metallic plate formed with a marginal portion surrounding a continuous web which surrounds a panel, said panel provided with long corrugations which traverse the panel and merge into the opposite portions of the web, said panel also provided with shorter, shallower corrugations which traverse a part of the panel and merge into the panel.

3. In combination with the other elements of a railway dump car; a door made of a metallic plate formed with a marginal portion surrounding a continuous web which surrounds a panel, said panel provided with long corrugations which traverse the panel and merge into the opposite portions of the web, said panel also provided with shorter corrugations which traverse a part of the panel and merge into the panel, said long corrugations being alternate with said shorter corrugations.

4. In combination with the other elements of a railway dump car; a door made of a metallic plate formed with a marginal portion surrounding a continuous web which surrounds a panel, said panel provided with long corrugations which traverse the panel and merge into the opposite portions of the web, said panel also provided with shorter, shallower corrugations which traverse a part of the panel and merge into the panel, said long corrugations being alternate with said shorter corrugations.

5. In combination with the other elements of a railway dump car; a door made of a metallic plate formed with a marginal portion surrounding a continuous web which surrounds a panel, said panel provided with long corrugations which traverse the panel and merge into the opposite portions of the web being of less depth than the web where they merge into it, said panel also provided with shorter corrugations which traverse a part of the panel and merge into the panel.

6. In combination with the other elements of a railway dump car; a door made of a metallic plate formed with a marginal portion surrounding a continuous web which surrounds a panel, said marginal portion provided with a flange substantially perpendicular thereto, said panel provided with long corrugations which traverse the panel and merge into the opposite portions of the web, said panel also provided with shorter corrugations which traverse a part of the panel and merge into the panel.

7. In combination with the other elements of a railway dump car; a door made of a metallic plate formed with a marginal portion surrounding a continuous web which surrounds a panel, said marginal portion provided with a flange substantially perpendicular thereto, said panel provided with long corrugations which traverse the panel and merge into the opposite portions of the web being of less depth than the web where they merge into it, said panel also provided with shorter corrugations which traverse a part of the panel and merge into the panel.

GARTH G. GILPIN.